United States Patent [19]
Preusser

[11] 3,811,535
[45] May 21, 1974

[54] VEHICLE BRAKE

[76] Inventor: Joe R. Preusser, 160 N. Collingsworth, El Paso, Tex. 79905

[22] Filed: Feb. 23, 1973

[21] Appl. No.: 335,130

[52] U.S. Cl. .................................. 188/29, 188/21
[51] Int. Cl. ..................................... B60t 1/04
[58] Field of Search ........................... 188/19–22, 188/29, 2 R, 74

[56] References Cited
UNITED STATES PATENTS

| 1,063,878 | 6/1913 | Hart | 188/21 X |
| 1,171,268 | 2/1916 | Smith | 188/29 UX |
| 1,715,938 | 6/1929 | Miller | 188/22 |
| 2,639,785 | 5/1953 | Vickers | 188/29 |
| 3,117,653 | 1/1964 | Altherr | 188/29 |

Primary Examiner—Duane A. Reger
Attorney, Agent, or Firm—James J. Brown

[57] ABSTRACT

A parking brake is described for use on materials handling vehicles or other small carts. The brake comprises an engagement lever for mechanically engaging the brake shoes against the vehicle's wheels. The lever is mounted on the side of the vehicle with a handle at one end and is connected at its other end at right angles to an axis which is generally parallel to the axle on which the wheels of the vehicle turn and runs through bearing means which are attachable to the base of the vehicle. Stops located on the axis engage the bearing means and prevent excessive lateral movement of the device. The brake shoes are, respectively, mounted directly on the engagement lever and a shorter lever connected at right angles to the opposite end of the axis. Means are also provided for latching the engagement lever with the shoes either engaging the vehicle wheels or out of contact with the wheels.

6 Claims, 4 Drawing Figures

PATENTED MAY 21 1974 3,811,535

VEHICLE BRAKE

BACKGROUND OF THE INVENTION

Materials handling vehicles such as carts, wagons, non-motorized trucks and the like are generally provided in lumber yards, building materials warehousing areas, hardware-home supply centers and similar businesses so that both employees and customers may have a convenient and easy means of transporting heavy and bulky items through and within the business operating areas to the customer's delivery vehicle. The materials handling vehicles, while providing a convenient means of transporting materials, create a definite safety hazard to life, limb and property in that they do not employ a parking brake apparatus as a component of their operating mechanisms. The absence of a parking brake apparatus allows these vehicles to move freely and unexpectedly. The unexpected movement of these vehicles which may occur due to their being positioned on unlevel surfaces, or due to the actions of loading or unloading or by accidental contact often causes these vehicles to roll into other vehicles, to hit unsuspecting customers or employees or to cause personal injury to the user who may be attempting to load or unload the vehicle.

The current invention provides an inexpensive braking apparatus that may be readily installed on materials handling vehicles of various designs and that will allow the operator of such vehicles to easily apply positive wheel braking to the vehicle so that the vehicle will remain stationary at all times until the applied braking action has been intentionally released. This braking feature is particularly important to the numerous businesses that use materials handling vehicles because of legal ramifications arising from the numerous accidents, injuries and property damage cused by brakeless materials handling vehicles of prior art.

SUMMARY OF THE INVENTION

This invention relates to a new and improved parking brake apparatus for materials handling vehicles which comprises means for driving brake shoe elements forcibly across the circumferential surface of the vehicle's tires. In accordance with the invention, brake engagement is effected by a simple, manually operated lever mounted on one side of the vehicle. One braking element is mounted directly on said operating lever, the other, located on the opposite side of the vehicle, is mounted on a second lever at the end of a cross-rod which is in essence an extension of the operating lever. Means are provided to secure the operating lever when the brake is not engaged as well as to latch it in a brake-engaged position.

An important object of the present invention is to provide a parking brake apparatus for materials handling vehicles of the type herein described that when applied will, through wheel arresting action, prevent the movement of said vehicles in any direction.

A further object of this invention is to provide an apparatus for applying a positive arresting action to the tires of materials handling vehicles wherein, when engaged, the brake shoe elements bear forcibly, yet not damagingly, across the circumferential surface of the tires of the vehicle.

Yet another object of the present invention is to provide a parking brake apparatus of simple design that may be readily and easily installed on the various configurations of materials handling vehicles of present-day manufacture.

Another object of the present invention is to provide means for securing the operating handle of the parking brake apparatus during periods of brake disengagement so that the handle is restrained from free movement and therefore will not present a hazard to personnel or material objects along the pathway of the vehicle.

Another object of this invention is to provide a simple and positive means for latching the parking brake in the engaged position until it is manually released by the operator.

Another object of the present invention is to provide a simple means for communicating the action of the brake from the operating handle to the brake shoe mounted on the opposite side of a materials handling vehicle.

Another object of the present invention is to provide a complement of parts of the parking brake device in kit form that may be installed on materials handling vehicles not provided with a parking brake feature.

The objects and other features of the present invention will become more apparent when considering the following description of the preferred embodiment of this invention and associating the detailed description and specific claims with the accompanying drawings wherein similar reference characters denote similar elements throughout the several views.

Figure 1:
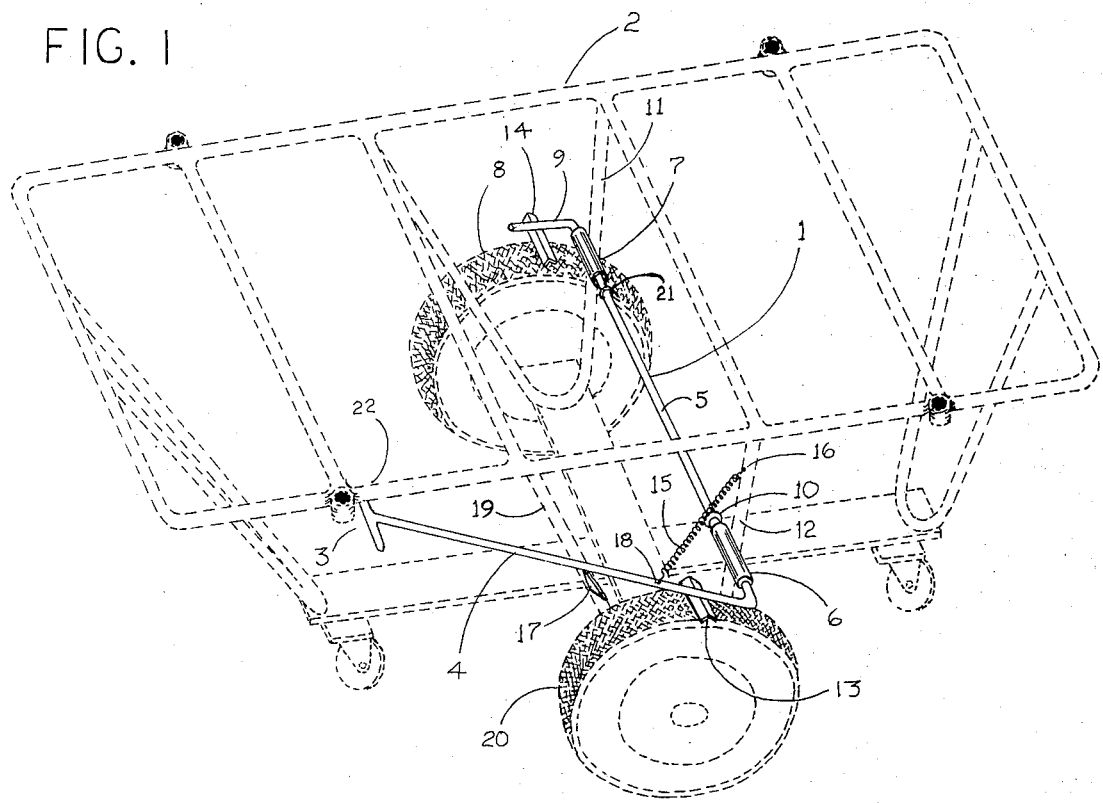
FIG. 1 is a perspective view of the invention installed on a materials handling vehicle.
Figure 2:
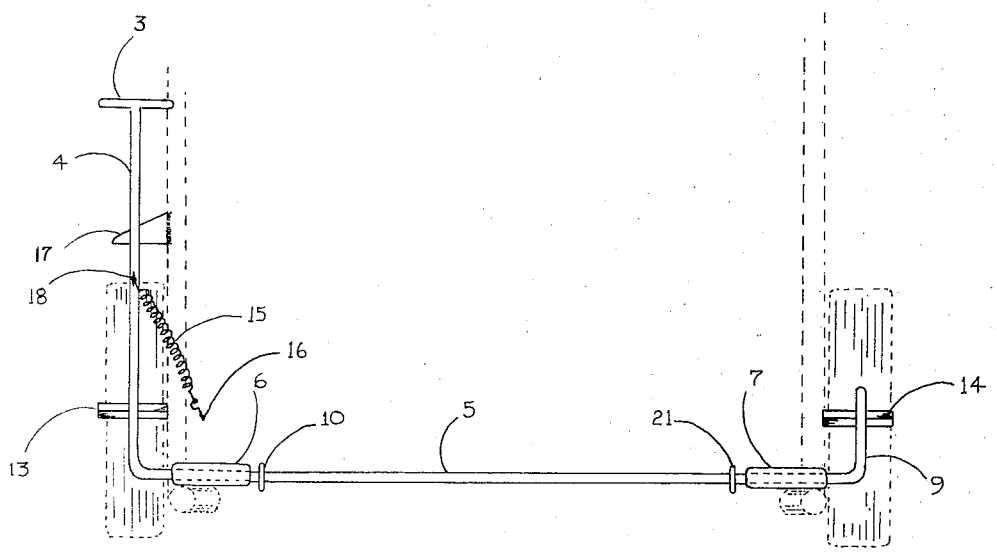
FIG. 2 is an overhead view of the invention.
Figure 3:
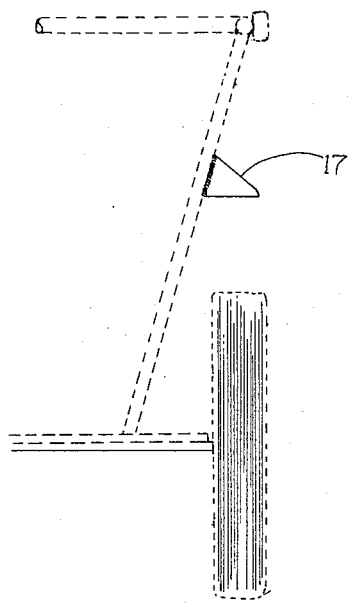
FIG. 3 is a rear view of the handle latch-piece of the invention.

In the drawings wherein for the purpose of illustration is shown a preferred embodiment of the invention and wherein similar reference characters designate corresponding parts throughout the several views, the complete parking brake apparatus is designated 1 and an exemplary materials handling vehicle on which it is shown installed is designated 2.

As shown in FIG. 1, there is a materials handling vehicle 2 of common design upon which a preferred embodiment of the current invention, generally designated by the numeral 1, has been installed to provide the user of such vehicle with a parking brake feature.

FIG. 1-4 the parking brake apparatus comprises a "T"-shaped handle 3 and a brake engagement lever 4 disposed on the righthand side of the materials handling vehicle in such a manner that the brake engagement lever 4 is above and in close proximity to the vehicle's right tire 20 and in such alignment that its longitudinal axis is centered on and traverses the length of the chord of the vehicle's right tire 20 whereupon the brake engagement lever 4 evolves, through a 90° bend, into a cross-rod 5 which extends perpendicular to the vehicle's 2 longitudinal axis and across the width of the vehicle 2, through a right and left bearing means 6 and 7, respectively, to a point above the approximate center of the chord of the vehicle's left tire 8 whereupon the cross-rod 5 evolves, through a 90° bend into a short brake lever 9 which extends rearward for a distance equal to approximately one-half the diameter of the vehicle's left tire 8. All elements of the parking brake apparatus 1 as described are in a single plane and all bends are 90° bends as shown within that plane.

A right brake shoe 13 of angular construction is disposed on the lower surface of the brake engagement lever 4 at a point over the approximate diametric center of the vehicle's right tire 20. Additionally, a left brake shoe 14 of angular construction is disposed on the lower surface of the short brake lever 9 at a point over the approximate diametric center of the vehicle's left tire 8. The cross-rod 5 is constrained radially by left bearings means 7 disposed on the vehicle's frame strut 11 and right bearing means 6 disposed on the vehicle's frame strut 12. Axial constraint of the cross-rod 5 is achieved by washer-like stops 10 and 21 disposed on the cross-rod 5 adjacent to and to bear against the axis bearings 6 and 7. Bearing means 6 and 7 may be constructed from lengths of steel pipe or tubing. The stops 10 and 21 may be fabricated from steel washers or short lengths of pipe tubing or other like means and are disposed on the tie-rod 5 a short distance from the bearing means 6 and 7, respectively, in order to permit the tie-rod to have some lateral displacement.

Figure 4:
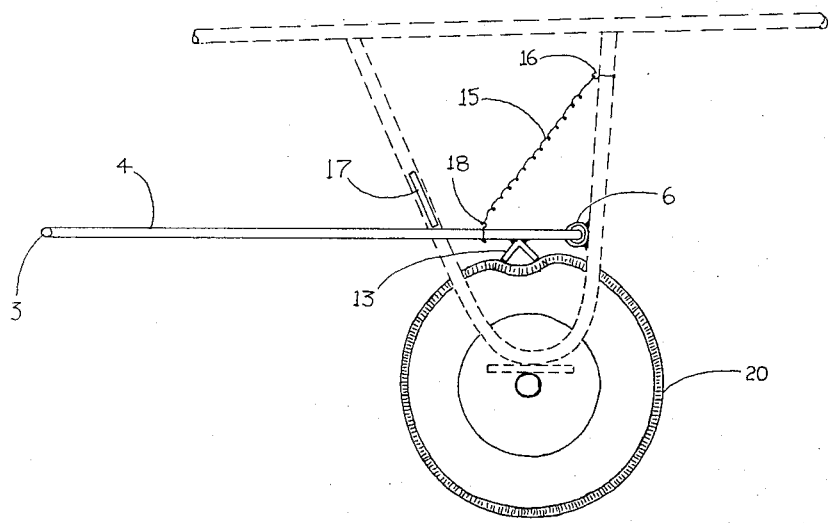
FIG. 4 is a side view of the invention shown in the engaged position.

A tension spring 15 disposed between spring anchor points 16 and 18 has two purposes; the tension spring 15 acts to secure the brake engagement lever 4 in the engaged position once it has been so placed and to restrain the brake engagement from swinging freely when it is in the disengaged position. The parking brake apparatus 1 further comprises a brake engagement lever latch 17 which is shown disposed on the vehicle's frame strut 19. Latching of the brake engagement lever 4 is accomplished by depressing the brake engagement lever 4 and lodging it beneath the brake engagement latch lever 17 where it is restrained by tension spring 15 until manually released by the operator. FIG. 4 shows the brake engagement lever 4 in the latched position.

In use, to engage the parking brake, the "T" handle 3 is moved to position the brake engagement lever 4 substantially radially, but also about the latch 17, towards the lumber truck tires until the brake shoes 13 and 14 are simultaneously driven forcibly against the lumber truck tires, respectively, 8 and 20; the "T" handle 3 is then moved towards the lumber truck frame 22, to lodge the brake engagement lever 4 beneath the latch 17. To disengage the parking brake, the "T" handle 3 is moved away from the lumber truck frame 22 to dislodge the brake engagement lever 4 from beneath the latch 17; thereafter, the initial force of the depressed tires 8 and 20 on the brake shoes 13 and 14 and the sustained force of the tension spring 15 drives the brake engagement lever 4 and the short brake lever 9, and thereby the brake shoes 13 and 14, clear of contact with the tires 8 and 20.

The material for constructon of the parking brake has been described substantially as steel whereas many other materials suitable for the purpose may be used whether metallic or non-metallic or of different cross-section. With steel, welding is the obvious fixed-fastening means for construction of the parking brake but other fastening means may be used and would have to be used for non-metallic materials.

While a particular embodiment of the invention has been shown and described, it will be understood that various modifications or alterations may be made without departing from the true spirit and scope of the invention, and any such changes or modifications are intended to be contemplated within the scope of the appended claims.

Having described this invention, what I assert as new and pray issuance of Letters of Patent for, is:

1. A parking brake suitable for use on materials handling vehicles having a plurality of wheels mounted on axles wherein said parking brake comprises: a brake engagement lever means for engaging brake shoe means against the wheels of said vehicle; said brake engagement lever means further having its longitudinal axis substantially at right angles to the axle on which the wheels of said vehicle turn and, further, having disposed at one end thereof a handle means for variably positioning the brake engagement lever means substantially radially about axis means disposed at the other end thereof and at right angles to the brake engagement lever means and generally parallel to the axles of the vehicle; said axis means being operably constrained radially by bearing means which are attachable to the base of said vehicle and axially by stop means disposed on the axis bearing means; said axis means having disposed on its end opposite the brake engagement lever and radially in the same plane as the brake engagement lever, a relatively short brake lever at right angles to the axis means; said short brake lever and also the brake engagement lever, each having disposed on it brake shoe means for engaging the wheels of said vehicle so that the brake shoe means are radially close to the respective peripheries of said vehicle's tires; said parking brake further comprising a latching means for said brake engagement lever disposed on the frame of the vehicle on the same side as and in proximity to a point on the brake engagement lever so that the latter can lodge beneath the latching means when the brake shoe means are engaged with the vehicle's wheels and secured therein by tension means disposed between the brake engagement lever and the vehicle frame for maintaining said lever against said latching means; said tension means further being active between the vehicle frame and the brake engagement lever to restrain the latter when said brake shoe means is disengaged from the vehicle wheels.

2. The parking brake of claim 1 wherein the brake engagement lever, the axis means and the short brake lever disposed at the end of the axis means opposite to the brake engagement lever comprise simple rod lengths which are one continuous rod length formed into the three parking brake components.

3. The parking brake claim 1 wherein the bearing means comprise lengths of pipe or tube.

4. The parking brake of claim 1 wherein the brake shoe means are lengths of structural angle disposed on said parking brake, brake engagement lever and on the short brake lever in such position that radial positioning of the brake engagement lever about its axis means and genrally in a direction towards the vehicle's wheels causes the brake shoe elements to bear against and engage vehicle's wheels.

5. The parking brake of claim 1 wherein said tension means comprises an elongated, extendible spring attachable at one end to the side of said vehicle and at the other end attached to said brake engagement lever.

6. The parking brake of claim 1 wherein said latching means comprises a triangular wedge under which said brake engagement lever can be positioned when said brake shoe means are engaged with the vehicle's wheels.

* * * * *